Patented Aug. 8, 1939

2,168,379

UNITED STATES PATENT OFFICE

2,168,379

PROCESS FOR PREPARING DERIVATIVES OF HALOGENATED STEROLS AND THE PRODUCTS THUS OBTAINED

John Weijlard and Joseph R. Stevens, Rahway, N. J., assignors to Merck & Co., Inc., Rahway, N. J., a corporation of New Jersey No Drawing. Application July 23, 1936, Serial No. 92,148

11 Claims. (Cl. 260—397)

This invention relates to a method of converting halogenated sterols and related products into their derivatives in which the halogen is replaced by the group

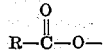

wherein R is an aromatic or aliphatic radical.

While the reaction of the processes to be described herein has been found to be generally applicable to the groups mentioned, it may be utilized with particular effectiveness in the ultimate derivation of certain male sex hormones from appropriately selected halogenated sterols. Butenandt (Z. Physiol. Chem., vol. 229, p. 192, 1934) reported a method of carrying out a reaction of this kind for the production of androsterone. His reported method comprises treating the chlor-ketone $\Delta^{5,6}$-3-chlor-etio-cholenone-(17) with potassium acetate in glacial acetic acid for five hours at 180° C., and then hydrolyzing the thus obtained acetate to the desired androsterone.

By this process, however, because of the high temperature and pressure employed, large amounts of resinous substances and unsaturated ketones are produced, and only a comparatively low and unsatisfactory yield of the desired end material is obtained. This process also has the disadvantage that if the relatively prolonged high temperatures given by Butenandt are not very carefully controlled the results may be so impaired as to render them practically negative.

It was sought, therefore, to discover a method of carrying out a reaction of this general character smoothly and with an increased yield.

We have now found a satisfactory method by which the reaction may be carried out satisfactorily, and one which results in the production of a much greater yield with only minimal amounts of unsublimable by-products.

In general, our process consists essentially in reacting upon the halogenated sterol with a mixture of a silver salt and a solution of an alkali or alkali-earth metal salt in a suitable solvent. The solvent should preferably be an organic acid which is capable of dissolving its alkali or alkali-earth metal salts, such as for example, acetic acid, propionic acid, benzoic acid, etc. Thus, for instance, a mixture of silver acetate and a solution of potassium acetate in glacial acetic acid has proved entirely suitable for the purposes of our invention.

Treatment of the halogenated sterol with a solution of either of the salts alone does not yield the satisfactory results obtained by our use of the two salts in combination. While the exact nature of the reaction which takes place in the presence of the mixture of the salts is not entirely clear, the differences in the results obtained by their use are clearly manifest.

Our process is generally valid by the appropriate adaptation in accordance with the general disclosures herein, if the halogenated sterols are treated with an organic acid salt of silver and an organic acid salt of an alkali or alkali-earth metal in an organic acid solvent which is capable of dissolving the alkali or alkali-earth metal salt and which will not reduce the silver salt used, but the preferred method for the production of uniformly pure and unmixed products involves the use of the corresponding acid radical in the silver salt and the alkali or alkali-earth metal salt, as well as the solvent.

By our new and improved process generally described above, and to be exemplified in detail hereinafter, the disadvantages of using either the silver salt or the alkali salt alone are overcome. The halogen is quantitatively removed and replaced by the desired acid group, and the desired end product is obtained from such resulting intermediate by hydrolysis by conventional methods.

Examples

1. About 1 gm. of pure $\Delta^{5,6}$-3-chlor-etio-cholenone-(17) is dissolved in about 100 cc. of a solution of potassium acetate in glacial acetic acid having a boiling point of 135–138° C. (= about 23% potassium acetate), about 1.5 gms. of silver acetate are added and the mixture is refluxed for five hours and filtered while hot. The filtrate is diluted with water, extracted with ether, the ether solution extracted with water and dilute alkali solution and evaporated to dryness. The crude acetate is refluxed with 3N methanolic KOH for two hours, diluted with water, extracted with ether, the ether solution washed with water, dried, evaporated to dryness, and sublimed. The androsterone is purified by recrystallization from ether and petroleum ether. A relatively large yield of the hormone practicable for use on a commercial scale is obtained.

2. About 0.2 gm. of α-cholestyl chloride is treated with 0.3 gm. of silver acetate and a solution of 20 cc. potassium acetate in glacial acetic acid having a boiling point of 135–138° C. (= about 23% potassium acetate). The mixture is refluxed for five hours, and filtered while hot.

By this treatment, the halogen is quantitatively removed, and α-cholestyl acetate is obtained.

3. About 1 gm. of silver benzoate is added to a mixture of about 1 gm. of sodium benzoate in about 25 gms. of molten benzoic acid, and the temperature brought to about 140° C. About 1 gm. of α-cholestyl chloride is added and the mixture is heated at 150–155° C. for about four hours. The reaction mixture is cooled and worked up in the usual manner. The chlorine is thus quantitatively removed; a yield of over 50% dihydrocholesterol is obtained.

By proceeding in like manner with other combinations of a silver salt and an alkali or alkali-earth metal salt of an organic acid in solution in an organic acid solvent in which the alkali salt is soluble and which will not reduce the silver salt, similar satisfactory results may be obtained. Thus, by reacting on halogenated sterols with combinations comprising silver acetate and a solution of sodium acetate in glacial acetic acid; silver propionate and sodium propionate in propionic acid; silver acetate and calcium acetate in glacial acetic acid, silver benzoate and sodium benzoate in benzoic acid, etc. the halogen is substantially quantitatively removed and replaced by the acid group.

The examples given herein are merely illustrative of our processes as applied to particular sterols, and we do not desire to be limited strictly thereto, as it will be obvious that the process may be generally applied where it is desired to replace the halogen of a halogenated sterol with a group of the general formula

where R is an aliphatic or aromatic radical.

We claim as our invention:

1. A process for replacing the halogen in halogenated sterols with the group

wherein R represents a radical selected from the group consisting of aliphatic and aromatic radicals, which comprises reacting upon the sterol with a mixture of a silver salt and a solution of a salt, selected from the group consisting of alkali metal and alkali earth metal salts of a carboxylic organic acid, in a carboxylic organic acid capable of dissolving its alkali and alkali earth metal salt, and which does not reduce the silver salt.

2. A process for replacing the halogen in halogen-substituted sterols which comprises reacting upon the sterol with a mixture of silver acetate and a solution of potassium acetate in glacial acetic acid.

3. A process for replacing the halogen in halogen-substituted sterols which comprises reacting upon the sterol with a mixture of silver benzoate and a solution of sodium benzoate in molten benzoic acid.

4. A process for replacing the halogen in halogen-substituted sterols which comprises reacting upon the sterol with a mixture of silver acetate and a solution of calcium acetate in glacial acetic acid.

5. In a process for producing male sex hormones from $\Delta^{5,6}$-3-halogen-etio-cholenone-(17), the steps which comprise reacting upon the latter with a mixture of silver acetate and a solution of potassium acetate in glacial acetic acid, and converting the acetate thus obtained to the desired end product by hydrolysis.

6. In a process for producing male sex hormones from appropriately halogenated sterols, the steps which comprise reacting upon the sterol with a mixture of a silver salt of a carboxylic organic acid and a solution of salt selected from the group consisting of alkali metal and alkali earth metal salts of a carboxylic organic acid in a carboxylic organic acid solvent capable of dissolving such alkali or alkali earth salt without reducing the said silver salt, and then converting the intermediate thus obtained to the desired hormone by hydrolysis.

7. The reaction product of a halogenated sterol with a silver salt and a salt selected from the group consisting of alkali metal and alkali earth metal salts of a carboxylic organic acid in solution in a carboxylic organic acid solvent in which the alkali or alkali earth salt is soluble and which will not reduce the silver salt.

8. The reaction product of a chlorinated sterol with a silver salt and a salt selected from the group consisting of alkali metal and alkali earth metal salts of a carboxylic organic acid in solution in a carboxylic organic acid solvent in which the alkali or alkali earth salt is soluble and which will not reduce the silver salt.

9. The reaction product of a halogenated sterol with silver acetate and an alkali metal acetate in solution in glacial acetic acid.

10. The reaction product of a chlorinated sterol with silver acetate and an alkali metal acetate in solution in glacial acetic acid.

11. The reaction product of a halogenated sterol with silver benzoate and an alkali metal benzoate in solution in benzoic acid.

JOHN WEIJLARD.
JOSEPH R. STEVENS.